US012703576B2

(12) United States Patent
Laukenmann et al.

(10) Patent No.: US 12,703,576 B2
(45) Date of Patent: Aug. 11, 2026

(54) FEEDING DEVICE AND METHOD FOR FEEDING SMALL PARTS

(71) Applicant: OPTIMA pharma GmbH, Schwäbisch Hall (DE)

(72) Inventors: Bernd Laukenmann, Crailsheim (DE); Fabienne Lydia Bernatek, Schwäbisch Hall (DE); Florian Weippert, Schwäbisch Hall (DE)

(73) Assignee: OPTIMA pharma GmbH, Schwäbisch Hall (DE)

( * ) Notice: Subject to any disclaimer, the term of this patent is extended or adjusted under 35 U.S.C. 154(b) by 79 days.

(21) Appl. No.: 18/868,999

(22) PCT Filed: May 11, 2023

(86) PCT No.: PCT/EP2023/062657

§ 371 (c)(1),
(2) Date: Nov. 25, 2024

(87) PCT Pub. No.: WO2023/227385

PCT Pub. Date: Nov. 30, 2023

(65) Prior Publication Data

US 2025/0346437 A1 Nov. 13, 2025

(30) Foreign Application Priority Data

May 25, 2022 (DE) ......................... 102022205283.8

(51) Int. Cl.
*B65G 27/02* (2006.01)
*B65G 47/14* (2006.01)
*B65G 47/20* (2006.01)

(52) U.S. Cl.
CPC ......... *B65G 47/1421* (2013.01); *B65G 27/02* (2013.01); *B65G 2203/041* (2013.01)

(58) Field of Classification Search
CPC .... B65G 27/02; B65G 47/14; B65G 47/1421; B65G 47/145; B65G 47/20
(Continued)

(56) References Cited

U.S. PATENT DOCUMENTS 3,277,996 A * 10/1966 Thurston .............. B65G 47/684 198/391
3,730,325 A 5/1973 Goodwin
(Continued)

FOREIGN PATENT DOCUMENTS

| CN | 114476597 A | 5/2022 |
|---|---|---|
| DE | 10 2018 120 722 A1 | 2/2020 |
| EP | 0 213 417 A1 | 3/1987 |

OTHER PUBLICATIONS

International Search Report issued Sep. 8, 2023 in connection with PCT/EP2023/062657.
(Continued)

*Primary Examiner* — Douglas A Hess
(74) *Attorney, Agent, or Firm* — Blank Rome

(57) ABSTRACT

The invention relates to a feeding device (1) for feeding small parts, in particular closure elements, comprising a vibrating spiral conveyor (20) having an outlet (200), a feed rail (20), which is arranged downstream of the outlet in the feed direction, and a vibratory drive (201, 211, 221), wherein, by means of the vibratory drive (201, 211, 212), vibrations can be applied to the vibrating spiral conveyor (20) to move the small parts in the direction of the outlet (200) and to the feed rail (21) to move the small parts along the feed rail (21), wherein an intermediate rail (22) is arranged between the outlet (200) of the vibrating spiral conveyor (20) and the feed rail (21), wherein vibrations can be applied to the intermediate rail (22) by means of the vibratory drive (201, 211, 221) to move the small parts along the intermediate rail (22) in the direction of the feed rail (21),
(Continued)

wherein a monitoring device (3), associated with the intermediate rail (22), is provided, wherein the monitoring device (3) is designed to detect an abnormality and/or disturbance in the movement of the small parts along the intermediate rail (22).

13 Claims, 2 Drawing Sheets

(58) Field of Classification Search
USPC .......................................................... 198/391
See application file for complete search history.

(56) References Cited

U.S. PATENT DOCUMENTS 4,365,445 A * 12/1982 Watson ................... B24B 5/355 470/164
4,462,508 A * 7/1984 Grafius ............. B65G 47/1421 221/160
4,892,180 A 1/1990 Sticht
5,083,654 A * 1/1992 Nakajima ............. B65G 43/08 198/380
5,120,190 A * 6/1992 Smith ................ B65G 47/1492 414/811
5,419,442 A * 5/1995 Wright, Jr. ................ B07C 5/36 209/920
5,713,454 A * 2/1998 Jordan .................. B23P 19/001 198/396
5,853,078 A * 12/1998 Kneubuhler ....... B65G 47/1421 198/395
6,012,603 A * 1/2000 Shikakubo ......... B65G 47/1421 221/277
6,782,992 B2 * 8/2004 Mimura ................. B65G 27/34 198/443
7,789,215 B1 * 9/2010 Snyder .................. B65G 27/02 198/757
7,971,704 B2 * 7/2011 Chi .................... B65G 47/1421 198/756
8,640,852 B2 * 2/2014 Seki ................... B65G 47/1457 198/380
9,333,697 B2 * 5/2016 Takeda ................. B65G 11/163
10,071,866 B2 * 9/2018 Fallon ................ B65G 47/8876
10,150,624 B2 * 12/2018 Doudement ...... B29C 49/42061
10,239,698 B1 * 3/2019 Stemmerich ....... B65G 47/1421
11,365,063 B2 * 6/2022 Berger ................... B65G 47/20
12,048,674 B2 * 7/2024 Yang ..................... A61J 7/0427

OTHER PUBLICATIONS

Written Opinion of the International Searching Authority issued Sep. 8, 2023 in connection with PCT/EP2023/062657.

* cited by examiner

FEEDING DEVICE AND METHOD FOR FEEDING SMALL PARTS

CROSS-REFERENCE TO RELATED APPLICATIONS

This application is a national phase of PCT/EP2023/062657, filed May 11, 2023, and claims priority to German Patent Application No. 102022205283.8, filed May 25, 2022, the entire contents of both of which are hereby incorporated by reference.

FIELD OF APPLICATION AND PRIOR ART

The invention relates to a feeding device and a method for feeding small parts, in particular closure elements.

To fill containers such as bottles (vials), infusion bottles, cartridges, disposable syringes or the like, with liquid or powder products, in particular pharmaceutical and bio-pharmaceutical products, filling and/or closure are systems known, wherein the containers, preferably immediately after they are filled and possibly subsequently checked, are closed by a closure element, for example a plug and/or a cap.

The filling of containers with sensitive or hazardous products is conventionally carried out in an isolator. In addition, systems without an isolator for filling containers with pharmaceuticals and/or other products are also known.

Feeders for storing and feeding closure elements are known, which comprise a vibrating spiral conveyor, also referred to as a sorting bowl, and a feed rail having a vibratory drive, which feed rail is arranged downstream of the vibrating spiral conveyor. In connection with the application, vibrating spiral conveyors refer to storage containers for small parts to which vibrations are applied, resulting in the small parts present in the storage container being conveyed in the direction of an outlet. For this purpose, vibrating spiral conventionally have conveyors a conveyor spiral along which the small parts are conveyed. It is further known to provide a sorting portion with chicanes between the conveyor spiral and the outlet, wherein, by means of the chicanes, small parts which do not have the desired orientation for the following application are thrown back into the vibrating spiral conveyor and, if possible, only small parts with a desired orientation are conveyed to the outlet. However, even in a embodiment with chicanes for sorting purposes, the possibility of small parts which do not have the desired orientation being conveyed to the outlet cannot be ruled out. It is also conceivable that faulty small parts, for example small parts with an oversize, will be conveyed to the outlet and subsequently cause a disturbance, in particular a jam.

Disturbances and/or abnormalities may moreover be caused in the transition from the vibrating spiral conveyor to the feed rail. The vibrations are applied to the vibrating spiral conveyor in a circular manner. In contrast, the vibrations are applied to the feed rail in a linear manner. Owing to the different movement excitation of the vibrating spiral conveyor and the feed rail arranged downstream thereof, disturbances and/or abnormalities may arise during the feed of the small parts, in particular in the transition region between the vibrating spiral conveyor and the feed rail.

Disturbances and/or abnormalities during the feed of the small parts, in particular during the feed of closure elements, may result in a shutdown of the filling and/or closure system. However, there is a high interest in avoiding shutdown periods if possible. Moreover, an unplanned shutdown of a filling and/or closure system for pharmaceutical and bio-pharmaceutical products may result in the products no longer being usable. This applies in particular—but not exclusively—to sensitive bio-pharmaceutical products.

OBJECT AND SOLUTION

Objects of the invention are to provide a feeding device and a method for feeding small parts, in particular closure elements, with which shutdown periods may be prevented or at least reduced.

These objects are achieved by the subject matters having the features of claims 1 and 6. Further embodiments are defined in the dependent claims.

According to a first aspect, a feeding device for small parts, feeding in particular closure elements, comprising a vibrating spiral conveyor having an outlet, a feed rail for the small parts, which is arranged downstream of the outlet in the feed direction, an intermediate rail arranged between the outlet of the vibrating spiral conveyor and the feed rail, and a vibratory drive is provided, wherein, by means of the vibratory drive, vibrations can be applied to the vibrating spiral conveyor to move the small parts in the direction of the outlet and to the feed rail to move the small parts along the feed rail and vibrations can be applied to the intermediate rail to move the small parts along the intermediate rail in the direction of the feed rail, wherein a monitoring device associated with the intermediate rail is provided, wherein the monitoring device is designed to detect an abnormality and/or disturbance in the movement of the small parts along the intermediate rail, and wherein the feeding device is designed to temporarily interrupt the application of vibrations to the intermediate rail and to the vibration spiral conveyor in order to rectify a detected abnormality and/or disturbance in the feeding device without interrupting the application of vibrations to the feed rail for moving the small parts along the feed rail.

In connection with the application, the term “a” is used as an indefinite article and not in a numerical sense. In particular, in some embodiments, provision is made to not provide only one vibratory drive, but to associate a separate vibratory drive with the vibrating spiral conveyor, the feed rail and/or the intermediate rail in each case.

With the feeding device, a vibratory excitation of the intermediate rail and the vibrating spiral conveyor of can be interrupted independently a vibratory excitation of the feed rail. Depending on the embodiment, the interruption of the vibratory excitation is effected by uncoupling the vibratory drive from the element driven thereby and/or by deactivating the vibratory drive.

As a result of the option of interrupting a vibratory excitation of the intermediate rail and of the vibrating spiral conveyor independently of a vibratory excitation of the feed rail, a disturbance and/or abnormality during a movement of the small parts along the intermediate rail may be rectified during a shutdown of the intermediate rail, whilst the movement of the small parts along the feed rail is continued so that the feeding of the small parts to a subsequent process, in particular the feeding of closure elements to a closing device which processes them, may be continued whilst the disturbance and/or abnormality is rectified.

After rectifying the disturbance and/or abnormality, the vibratory excitation of the intermediate rail and the vibrating spiral conveyor is resumed for conveying the small parts. As a result of the continuous movement of the small parts—inherent to the feeding device—in the direction of a delivery end of the feed rail, it is possible, with normal clocked removal of the small parts at the delivery end, to close a gap which has been created due to the temporary interruption of the vibratory excitation of the intermediate rail and of the vibrating spiral conveyor.

The intermediate rail and an outlet of the vibrating spiral conveyor in embodiments are separate components. In other embodiments, the intermediate rail and the outlet of the vibrating spiral conveyor are designed as a common component, wherein the common component has an elastically deformable transition point in order to enable different vibratory excitations of the intermediate rail and of the vibrating spiral conveyor. For a technically simple embodiment, the intermediate rail is realized as a separate component.

In an embodiment, the feed rail and the intermediate rail are arranged in a fixed manner in horizontal plane, wherein the conveyance of the small parts takes place exclusively via the vibrations. In another embodiment, the feed rail is arranged at an angle with respect to a horizontal plane, wherein an inlet end is arranged to be higher than a delivery end. As a result of the angled arrangement, the small parts, depending on their material nature, are additionally conveyed in the direction of the delivery end as a result of gravity, so that rapid closure of a gap is possible. To avoid the movement of such small parts along the intermediate rail during an interruption to the vibratory excitation of the intermediate rail, the intermediate rail, on the other hand, is arranged in a horizontal plane even when the feed rail is arranged at an angle. In another embodiment, the intermediate rail can be arranged for adjustment between a working position for normal operation and a fault position for rectifying a fault, wherein the intermediate rail is arranged in a horizontal plane in the fault position and at an angle to the horizontal plane in the working position.

The vibrating spiral conveyor, the feed rail and the intermediate rail are also referred to collectively as a feed unit.

In an embodiment, the monitoring device comprises one or more sensor devices. In an embodiment, a movement and/or a lack of movement of the small parts along the intermediate rail can be detected by the sensor device, wherein a lack of movement may be attributed to an abnormality and/or disturbance.

In an embodiment, the monitoring device comprises a camera. Images can be recorded by the camera, wherein an abnormality and/or disturbance can be detected via appropriate evaluation of the images. In an embodiment, an evaluation unit is associated with the camera, wherein the evaluation unit is designed to evaluate an image recorded by the camera using an artificial intelligence model (AI model). In an embodiment, a plurality of images of an image sequence which are recorded by the camera are evaluated by the evaluation unit using the AI model.

For this purpose, the AI is, model in particular, trained to detect closure elements and to classify detected closure elements, wherein the AI model is used to ascertain the image positions in which closure elements are present and to assign detected closure elements to a class. A suitable method for fault detection and handling is described, for example, in the post-published application DE 102021210749.4, which is incorporated herein in its entirety by reference.

In an embodiment, rectification of an abnormality and/or disturbance is carried out by a qualified expert.

Alternatively or additionally, in an embodiment, the feeding device comprises a manipulator, wherein a detected abnormality and/or disturbance can be rectified by the manipulator. For this purpose, the manipulator can be moved via a central machine control, decentralized manipulator control and/or via a manually actuable control to rectify the detected abnormality and/or disturbance. The use of a manipulator enables the detected abnormality and/or disturbance to be rectified in a closed chamber, for example in an isolator, without opening the chamber and/or without so-called glove interventions. In particular, an abnormality and/or disturbance in a sterile environment, for example in an isolator, may thus be rectified without impairing the sterile atmosphere.

In an embodiment, the manipulator is provided exclusively for the feeding device. In other embodiments, the manipulator is designed to carry out further tasks in the filling and/or closure system during operation and/or when setting-up the filling and/or closure system.

In an embodiment, a cover is provided over a transition region between the vibrating spiral conveyor and the intermediate rail. By means of the cover, the small parts are prevented from falling out in the transition region or at least the risk of them falling out is reduced. The cover covers part of the intermediate rail. In an embodiment, monitoring is therefore restricted to the remaining part of the intermediate rail. The cover may be manufactured from any material which is selected according to boundary conditions when using the feeding device. In other embodiments, a transparent cover is provided.

According to a second aspect, a method for feeding small parts, in particular closure elements, by means of a vibrating spiral conveyor having an outlet, a feed rail, which is arranged downstream of the outlet in the feed direction, and an intermediate rail arranged between the outlet of the vibrating spiral conveyor and the feed rail is provided, wherein, by means of a vibratory drive, vibrations are applied to the vibrating spiral conveyor to move the small parts in the direction of the outlet, to the feed rail to move the small parts along the feed rail and to the intermediate rail to move the small parts along the intermediate rail in the direction of the feed rail, wherein the intermediate rail is monitored in an automated manner by a monitoring device, wherein an abnormality or disturbance which occurs in the movement of the small parts along the intermediate rail is detected by the monitoring device, wherein, to rectify an abnormality and/or disturbance detected by the monitoring device during the feed of the small parts, the application of vibrations to the intermediate rail and to the vibrating spiral conveyor is temporarily interrupted without interrupting the application of vibrations to the feed rail for the movement of the small parts along the feed rail.

As a result of interrupting the vibratory drive of the intermediate rail and of the vibrating spiral conveyor whilst continuing the vibratory excitation of the feed rail, the delivery of the small parts at a delivery end of the feed rail can be continued whilst a fault is being rectified. Shutdowns may thus be avoided or at least reduced.

For automated monitoring, the intermediate rail is monitored by a monitoring device, wherein an abnormality and/or disturbance which occurs in the movement of the small parts along the intermediate rail is detected by the monitoring device.

In an embodiment, the monitoring device comprises a camera, wherein an image recorded by the camera is evaluated to detect an abnormality and/or disturbance, in particular evaluated using an artificial intelligence model (AI model).

Additionally, in an embodiment, provision is made for a detected abnormality and/or disturbance to be rectified by a manipulator, wherein the manipulator is moved by a central machine control, a decentralized manipulator control and/or by a manually actuable control to rectify the detected abnormality and/or disturbance.

According to an embodiment of the method, provision is made for the manipulator to be moved from an idle position into a maintenance position upon detecting an abnormality and/or disturbance, wherein the application of vibrations to the intermediate rail and to the vibrating spiral conveyor is interrupted before, during or after the movement of the manipulator into the maintenance position, the abnormality and/or disturbance at the intermediate rail is localized after the interruption to the application of vibrations, and the manipulator is moved from the maintenance position to rectify the detected abnormality and/or disturbance after the localization of the abnormality and/or disturbance.

An idle position of the manipulator refers to a position in which the manipulator is arranged during disturbance-free operation. In particular, when carrying out the method in an isolator, the idle position is selected such that the presence of the manipulator in the idle position has no influence—or no influence related to the method—on process management including an air supply.

In an embodiment, a single defined maintenance position, into which the manipulator is moved, is provided. In other embodiments, the maintenance position is redefined for each intervention.

The localization of the abnormality and/or disturbance takes place after an interruption to the vibratory excitation, i.e. when the small parts are no longer being moved along the intermediate rail. This enables precise localization for subsequent, preferably automated, rectification. In an embodiment, fully automated fault detection for detecting an abnormality and/or disturbance is provided and fully automated rectification of the detected abnormality and/or disturbance is also provided. The fault detection takes place during operation, in particular using a method described in post-published application DE the 102021210749.4 and/or using a device for fault detection and handling, which is described in the post-published application DE 102021210749.4. The rectification of the detected abnormality or disturbance is possible—depending on its severity—without interrupting the feed of the small parts to a subsequent process by shutting down the intermediate rail.

BRIEF DESCRIPTION OF THE DRAWINGS

Further advantages and aspects of the invention are described in the claims and in the description of an exemplary embodiment of the invention, which is explained below with reference to the figures, in which:

DETAILED DESCRIPTION OF THE EXEMPLARY EMBODIMENTS

Figure 1:
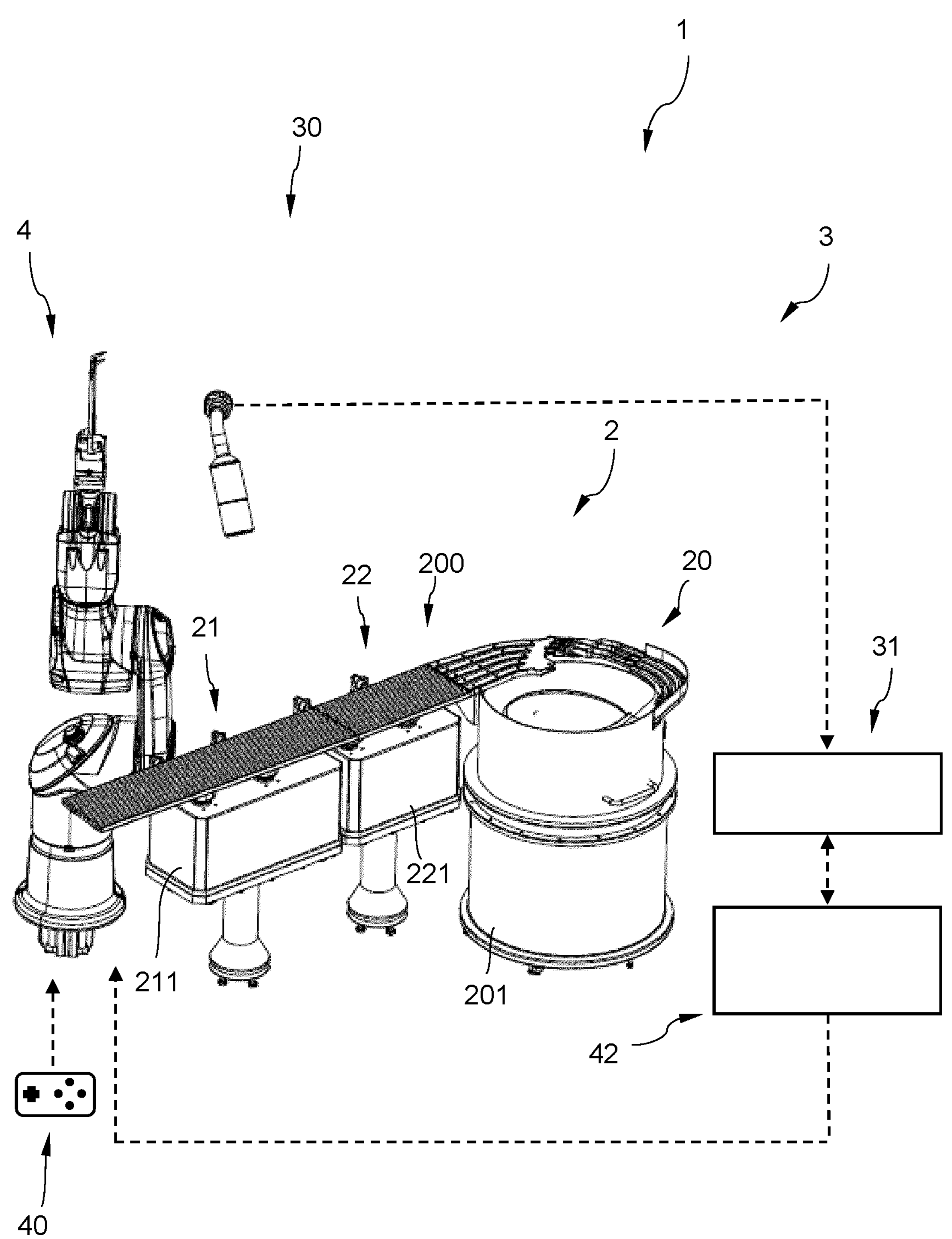
FIG. 1 shows a schematic illustration of a feeding device comprising a feed unit, a monitoring device and a manipulator
Figure 2:
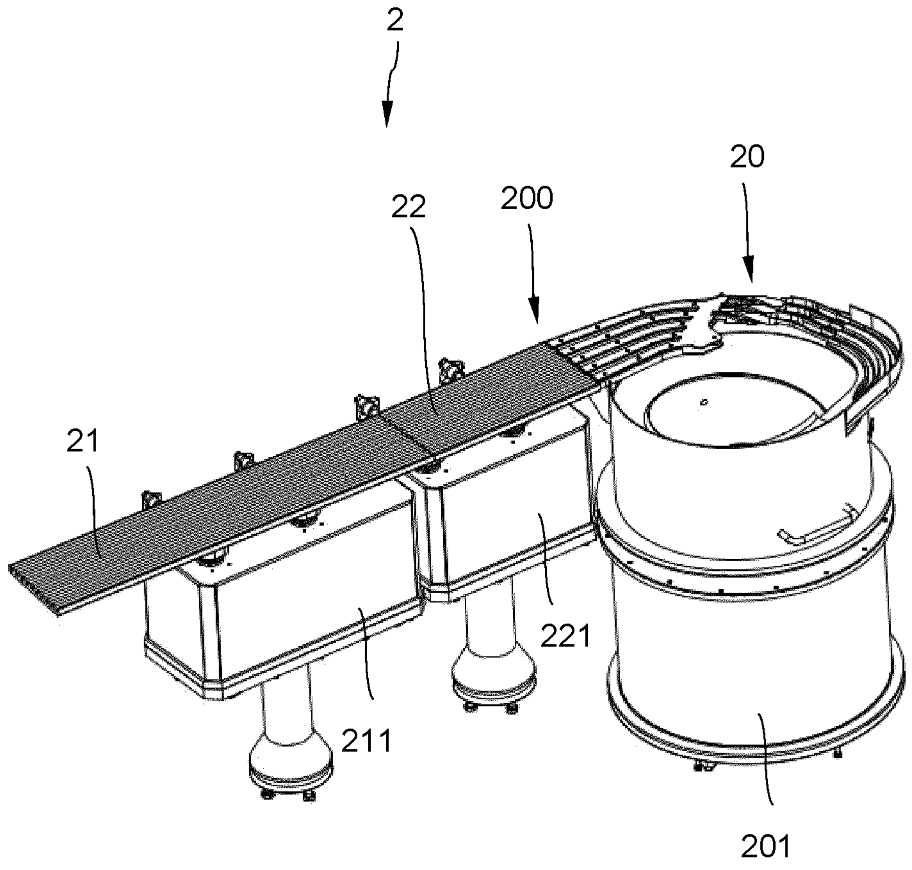
FIG. 2 shows a schematic illustration of the feed unit of the feeding device according to FIG. 1.

FIG. 1 shows a schematic illustration of a feeding device 1 for feeding small parts (not shown in FIG. 1), in particular for feeding closure elements. The illustrated feeding device 1 comprises a feed unit 2, a monitoring device 3 and a manipulator 4. FIG. 2 shows the feed unit 2 in isolation.

The feed unit 2 comprises a vibrating spiral conveyor 20 having an outlet 200, a feed rail 21, which is arranged downstream of the outlet 200 in the feed direction, and an intermediate rail 22 arranged between the outlet 200 of the vibrating spiral conveyor 20 and the feed rail 21. The outlet 200, the intermediate rail 22 and the feed rail 22 each comprise a plurality of parallel-arranged paths, along which small parts can be moved in parallel in the feed direction. The number of paths can be appropriately specified by a person skilled in the art depending on the particular application.

The illustrated feed unit 2 comprises three vibratory drives 201, 211, 221, wherein vibrations can be applied to the vibrating spiral conveyor 20 by means of a first vibratory drive 201 to move the small parts in the direction of the outlet 200, vibrations can be applied to the feed rail 21 by means of a second vibratory drive 211 to move the small parts along the feed rail 21, and vibrations can be applied to the intermediate rail 22 by means of a third vibratory drive 211 to move the small parts along the intermediate rail 22 in the direction of the feed rail 21.

The feeding device 1 is designed to temporarily interrupt the excitations of vibrations to the vibrating spiral conveyor 20 and to the intermediate rail 22 to rectify an abnormality and/or disturbance in the feeding device 1, for example by controlling the first vibratory drive 201 and the third vibratory drive 211 accordingly, without interrupting the excitation of vibrations to the feed rail 21 by means of the second vibratory drive 2 for the movement of the small parts along the feed rail 21.

It is thus possible to rectify an abnormality and/or disturbance which occurs at the intermediate rail 22 after stopping a vibration of the intermediate rail 22, wherein, by maintaining the movement of the small parts along the feed rail 21, it is possible to rectify the disturbance without interrupting feeding of the small parts to a subsequent process.

The feeding device 1 illustrated in FIG. 1 further comprises a monitoring device 3, which is associated with the intermediate rail 22 and—in the embodiment shown—has a camera 30. The monitoring device 3 is designed to detect an abnormality and/or disturbance in the movement of the small parts along the intermediate rail 22. For this purpose, images can be recorded by the camera 30, which images are evaluated in an evaluation unit 31. In an embodiment, the evaluation unit 31 is designed to evaluate images recorded by the camera 30 using an AI model.

A detected abnormality and/or disturbance may be rectified manually or by the manipulator 4. In the illustrated exemplary embodiment, a manually actuable control 40 is provided, wherein a person skilled in the art can move the manipulator 4 using the manually actuable control 40 to rectify the detected abnormality and/or disturbance. In an embodiment, by limiting the movement distances of the manipulator 4, it is ensured that collisions between the manipulator 4 and components arranged in the environment of the feeding device 1 and/or components of the feeding device 1 are avoided.

Alternatively, in the illustrated exemplary embodiment, a detected abnormality or disturbance can be communicated to a control 42, wherein the manipulator 4 can be moved via the control 42 to rectify the detected abnormality and/or disturbance. The control 42 is, for example, a central machine control of a filling and/or closure system or a decentralized manipulator control.

The illustrated feeding device 1 allows the feed unit 2 to be monitored for detecting abnormality and/or disturbance and, if necessary, to rectify a detected abnormality and/or disturbance in a fully automated manner, without human intervention. The rectification of the detected abnormality and/or disturbance is possible without shutting down the filling and/or closure arrangement.

What is claimed is:

1. A feeding device for feeding small parts, comprising a vibrating spiral conveyor having an outlet, a feed rail, which is arranged downstream of the outlet in a feed direction, and a vibratory drive, wherein, by means of the vibratory drive, vibrations can be applied to the vibrating spiral conveyor to move the small parts in the direction of the outlet and to the feed rail for moving the small parts along the feed rail, wherein an intermediate rail is arranged between the outlet of the vibrating spiral conveyor and the feed rail, wherein vibrations can be applied to the intermediate rail by means of the vibratory drive to move the small parts along the intermediate rail in the direction of the feed rail, wherein a monitoring device, associated with the intermediate rail, is provided, wherein the monitoring device is designed to detect an abnormality and/or disturbance in the movement of the small parts along the intermediate rail, and wherein the feeding device is designed to temporarily interrupt the application of vibrations to the intermediate rail and to temporarily interrupt the vibrating spiral conveyor in order to rectify an abnormality and/or disturbance in the movement of the small parts along the intermediate rail, which is detected by the monitoring device, without interrupting the application of vibrations to the feed rail for moving the small parts along the feed rail.

2. The feeding device according to claim 1, wherein a vibratory drive is associated with the vibrating spiral conveyor (20), the feed rail and/or the intermediate rail in each case.

3. The feeding device according to claim 1, wherein the monitoring device comprises a camera.

4. The feeding device according to claim 1, wherein the feeding device comprises a manipulator, wherein a detected abnormality and/or disturbance can be rectified by the manipulator, wherein the manipulator can be moved via a central machine control, a decentralized manipulator control and/or via a manually actuable control for rectifying the detected abnormality and/or disturbance.

5. The feeding device according to claim 1, wherein a cover is provided over a transition region between the vibrating spiral conveyor and the intermediate rail.

6. The feeding device according to claim 1, wherein the feeding device is a device for feeding closure elements.

7. The feeding device according to claim 1, wherein the monitoring device comprises a camera and an evaluation unit is associated with the camera, wherein the evaluation unit is designed to evaluate an image recorded by the camera using an artificial intelligence model (AI model).

8. A method for feeding small parts by means of a vibrating spiral conveyor having an outlet and a feed rail, which is arranged downstream of the outlet in a feed direction, wherein, by means of a vibratory drive, vibrations are applied to the vibrating spiral conveyor to move the small parts in the direction of the outlet and to the feed rail to move the small parts along the feed rail, wherein an intermediate rail is arranged between the outlet of the vibrating spiral conveyor and the feed rail, wherein vibrations are applied to the intermediate rail by means of the vibratory drive to move the small parts along the intermediate rail in the direction of the feed rail, wherein the intermediate rail is monitored in an automated manner by a monitoring device, wherein an abnormality and/or disturbance which occurs in the movement of the small parts along the intermediate rail is detected by the monitoring device, wherein, to rectify an abnormality and/or disturbance detected by the monitoring device during the feed of the small parts, the application of vibrations to the intermediate rail and to the vibrating spiral conveyor is temporarily interrupted without interrupting the application of vibrations to the feed rail for moving the small parts along the feed rail.

9. The method according to claim 8, wherein the monitoring device comprises a camera, wherein an image recorded by the camera is evaluated to detect an abnormality and/or disturbance.

10. The method according to claim 8, wherein a detected abnormality and/or disturbance is rectified by a manipulator, wherein the manipulator is moved via a central machine control, a decentralized manipulator control and/or via a manually actuable control to rectify the detected abnormality and/or disturbance.

11. The method according to claim 10, wherein the manipulator is moved from an idle position into a maintenance position upon detecting an abnormality and/or disturbance, wherein the application of vibrations to the intermediate rail and to the vibrating spiral conveyor is interrupted before, during or after the movement of the manipulator into the maintenance position, the abnormality and/or disturbance at the intermediate rail is localized after the interruption to the application of vibrations, and the manipulator is moved from the maintenance position to rectify the detected abnormality and/or disturbance after the localization of the abnormality and/or disturbance.

12. The method according to claim 8, wherein the method is for feeding closure elements.

13. The method according to claim 8, wherein the monitoring device comprises a camera, wherein an image recorded by the camera is evaluated to detect an abnormality and/or disturbance, using an artificial intelligence model (AI model).

* * * * *